United States Patent
Kong et al.

(10) Patent No.: US 10,489,448 B2
(45) Date of Patent: Nov. 26, 2019

(54) METHOD AND SYSTEM FOR DYNAMICALLY RANKING IMAGES TO BE MATCHED WITH CONTENT IN RESPONSE TO A SEARCH QUERY

(71) Applicant: Baidu USA LLC, Sunnyvale, CA (US)

(72) Inventors: Qi Kong, Sunnyvale, CA (US); Fan Zhu, Sunnyvale, CA (US); Guang Yang, Sunnyvale, CA (US); Jingao Wang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 384 days.

(21) Appl. No.: 15/171,283

(22) Filed: Jun. 2, 2016

(65) Prior Publication Data
US 2017/0351709 A1    Dec. 7, 2017

(51) Int. Cl.
 G06F 16/00    (2019.01)
 G06F 16/58    (2019.01)
 (Continued)

(52) U.S. Cl.
 CPC .... *G06F 16/5866* (2019.01); *G06F 16/24578* (2019.01); *G06F 16/532* (2019.01); *G06F 16/951* (2019.01)

(58) Field of Classification Search
 CPC .......... G06F 17/3053; G06F 17/30867; G06F 17/30657; G06F 17/30247; G06F 17/30253; G06F 17/30265; G06F 17/3028; G06F 17/30991; G06F 16/40; G06F 16/24578; G06F 16/73; G06F 16/3331; G06F 16/285; G06F 16/58; G06F 16/532; G06F 16/5866; G06F 16/951
(Continued)

(56) References Cited

U.S. PATENT DOCUMENTS

| | | |
|---|---|---|
| 7,580,568 B1 | 8/2009 | Wang et al. |
| 8,438,163 B1 * | 5/2013 | Li .................. G06F 17/3028 382/159 |

(Continued)

FOREIGN PATENT DOCUMENTS

JP    2015-153094    8/2015

OTHER PUBLICATIONS

European Communication of the extended EP Search Report for counterpart EP Application No. P16201475.7 dated Apr. 4, 2017, 10 pages.

*Primary Examiner* — Michelle N Owyang
(74) *Attorney, Agent, or Firm* — Womble Bond Dickinson (US) LLP

(57) ABSTRACT

According to one embodiment, images are identified to be matched with a content item that is identified in response to a search query. For each of the images, a matching type score is calculated based on a first set of one or more keywords associated with the search query and a second set of one or more keywords associated with the image. A matching quality score is calculated for the image based on the matching type score, the first set of keywords, and the second set of keywords. The images are ranked based on their respective matching quality scores. One of the images with a matching quality score higher than a predetermined threshold is selected, where the selected image is to be associated with the content item.

19 Claims, 12 Drawing Sheets

(51) Int. Cl.
*G06F 16/532* (2019.01)
*G06F 16/2457* (2019.01)
*G06F 16/951* (2019.01)

(58) Field of Classification Search
USPC .................................................. 707/600–899
See application file for complete search history.

(56) References Cited

U.S. PATENT DOCUMENTS

| | | | | |
|---|---|---|---|---|
| 9,195,717 | B2* | 11/2015 | Miller | G06F 16/40 |
| 9,268,469 | B2* | 2/2016 | Li | G06F 3/04842 |
| 2002/0038299 | A1 | 3/2002 | Zernik et al. | |
| 2009/0313239 | A1* | 12/2009 | Wen | G06K 9/00664 |
| 2012/0290566 | A1* | 11/2012 | Dasher | G06F 17/30864 |
| | | | | 707/723 |
| 2013/0073984 | A1* | 3/2013 | Lessin | G06F 3/0481 |
| | | | | 715/753 |
| 2013/0275418 | A1* | 10/2013 | Kumar | G06F 17/3053 |
| | | | | 707/723 |
| 2014/0241616 | A1* | 8/2014 | Medvedovsky | G06K 9/46 |
| | | | | 382/156 |
| 2015/0161129 | A1* | 6/2015 | Miller | G06F 17/3053 |
| | | | | 707/728 |
| 2015/0169575 | A1* | 6/2015 | Adam | G06F 16/5838 |
| | | | | 707/728 |
| 2015/0169708 | A1* | 6/2015 | Song | G06F 17/30247 |
| | | | | 707/722 |
| 2017/0053186 | A1* | 2/2017 | Allen | G06K 9/6215 |
| 2017/0199942 | A1* | 7/2017 | Ruffenach | G06F 17/212 |

* cited by examiner

| Keyword(s) | Image Identifier(s) |
|---|---|
| Flower | Image 1, Image 2, Image 3, Image 4, Image 5 |
| Beijing Flower | Image 1 |
| Shanghai Flower | Image 2 |
| Flower Delivery | Image 1, Image 2, Image 4 |
| 301 ... | 302 ... |

FIG. 3A

| Image ID | Keyword(s) |
|---|---|
| Image 1 | Flower, Beijing, Haidian District |
| Image 2 | Flower, Shanghai, Delivery |
| Image 3 | Flower, Delivery |
| 351 ... | 352 ... |

| Content ID | Matching Quality | Click-Through Rate | Image Quality | Image Style | Matching Type | ... | Overall/Ranking | Image 2 | ... |
|---|---|---|---|---|---|---|---|---|---|
| Content Item 1 | 0.6 | 0.03 | 0.9 | 0.7 | 0.5 | ... | 0.48 | ... | ... |
| Content Item 2 | 0.8 | 0.05 | 0.19 | 0.4 | 0.2 | ... | 0.29 | ... | ... |
| 801 ... | 802 ... | 803 ... | 804 ... | 805 ... | 806 ... | 807 ... | 810 ... | 822 ... | 823 ... |

Image 1 821

METHOD AND SYSTEM FOR DYNAMICALLY RANKING IMAGES TO BE MATCHED WITH CONTENT IN RESPONSE TO A SEARCH QUERY

FIELD OF THE INVENTION

Embodiments of the present invention relate generally to searching content. More particularly, embodiments of the invention relate to ranking images to be matched with content in response to a search query.

BACKGROUND

Most search engines typically perform searching of Web pages during their operation from a browser running on a client device. A search engine receives a search term entered by a user and retrieves a search result list of Web pages associated with the search term. The search engine displays the search results as a series of subsets of a search list based on certain criteria. General criteria that is used during a search operation is whether the search term appears fully or partly on a given webpage, the number of times the search string appears in the search result, alphabetical order, etc. Further, the user can decide to open a link by clicking on the mouse button to open and browse. Some of the user interactions with the search results and/or user information may be monitored and collected by the search engine to provide better searches subsequently.

Typically, in response to a search query, a search is performed to identify and retrieve a list of content items. The content items are then returned to a search requester. A conventional search engine would return most of the content items as is without modifying. Some of the content items in the search result are just plain text or description, which may deem to be unattractive or boring. Sometimes content in a search result would be more presentable or attractive if the content items are prepared with certain images that are related to the content items. However, it is quite challenge to match appropriate images with content items. There has been a lack of efficient ways to rank images for matching content items.

BRIEF DESCRIPTION OF THE DRAWINGS

Embodiments of the invention are illustrated by way of example and not limitation in the figures of the accompanying drawings in which like references indicate similar elements.

FIGS. 3A-3B are examples of query-image matching tables according to certain embodiments of the invention.

FIG. 8 is a block diagram illustrating an example of a scoring matrix for determining matching scores according to one embodiment of the invention.

DETAILED DESCRIPTION

Figure 1A:
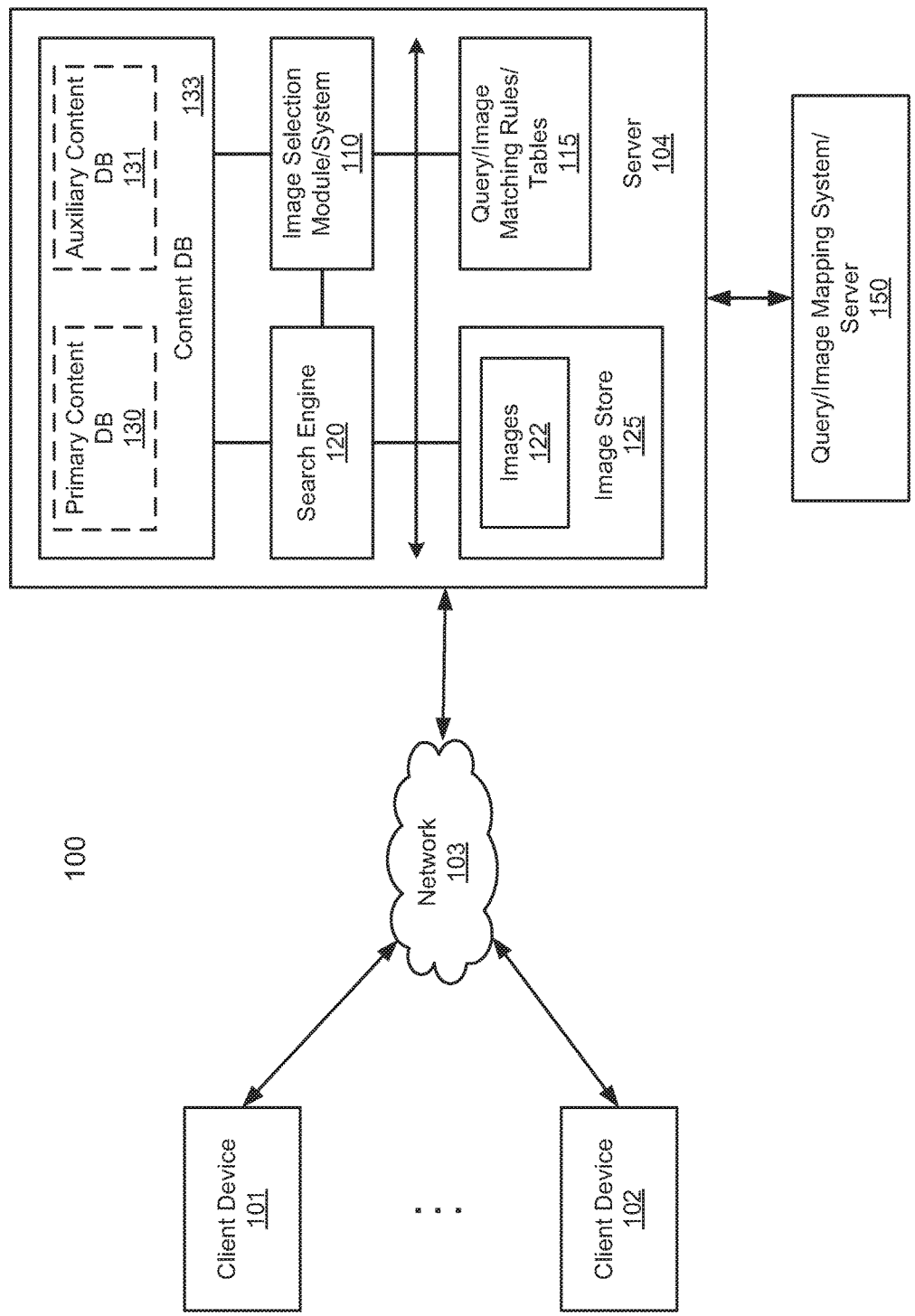
FIGS. 1A and 1B are block diagram illustrating an example of system configuration for matching images with content items according to some embodiments of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, an image ranking mechanism is provided to efficiently and accurately rank images that are utilized to match with a content item, where the content item is identified in response to a search query. For each of the images that are identified as image candidates to be matched with a content item, a feature score is calculated for each of the features (e.g., image attributes or properties, and/or any other metadata or data surrounding the image) that are extracted or determined from the image. Each feature score may be calculated using a specific feature score algorithm that has been trained or configured based on features of a large amount of images utilized to match content items in response to a large amount of search queries in the past. In addition, a matching type score between the image and the content item is determined based on metadata of the image, the search query, and the content item. A matching type score may be different dependent upon the matching types between a search query and an image that is identified based on the search query (e.g., matching keywords between the search query and the image). A matching type can an exact match, a partial match, or a broad match (e.g., semantic match).

A matching quality score is then calculated based on the feature scores of the features and the matching type score. The features associated with an image may include a variety of metadata, such as, for example, image attributes or properties (e.g., resolution, brightness, contrast, orientation, size, source of the image, content represented by the image). A matching quality score may be calculated using a predetermined algorithm based on the matching type score and at least some of the feature scores. Alternatively, a matching quality score may be determined by applying the matching type score and the feature scores to a ranking model that has been trained using historic image data, query data, and user interactive data. The matching quality score is then utilized as a ranking score to rank the corresponding image in view of the matching quality scores of other images. One of the images having a ranking score higher than a predetermined threshold may be selected to be matched with the content item, for example, as a background image with respect to the content item.

Figure 1B:
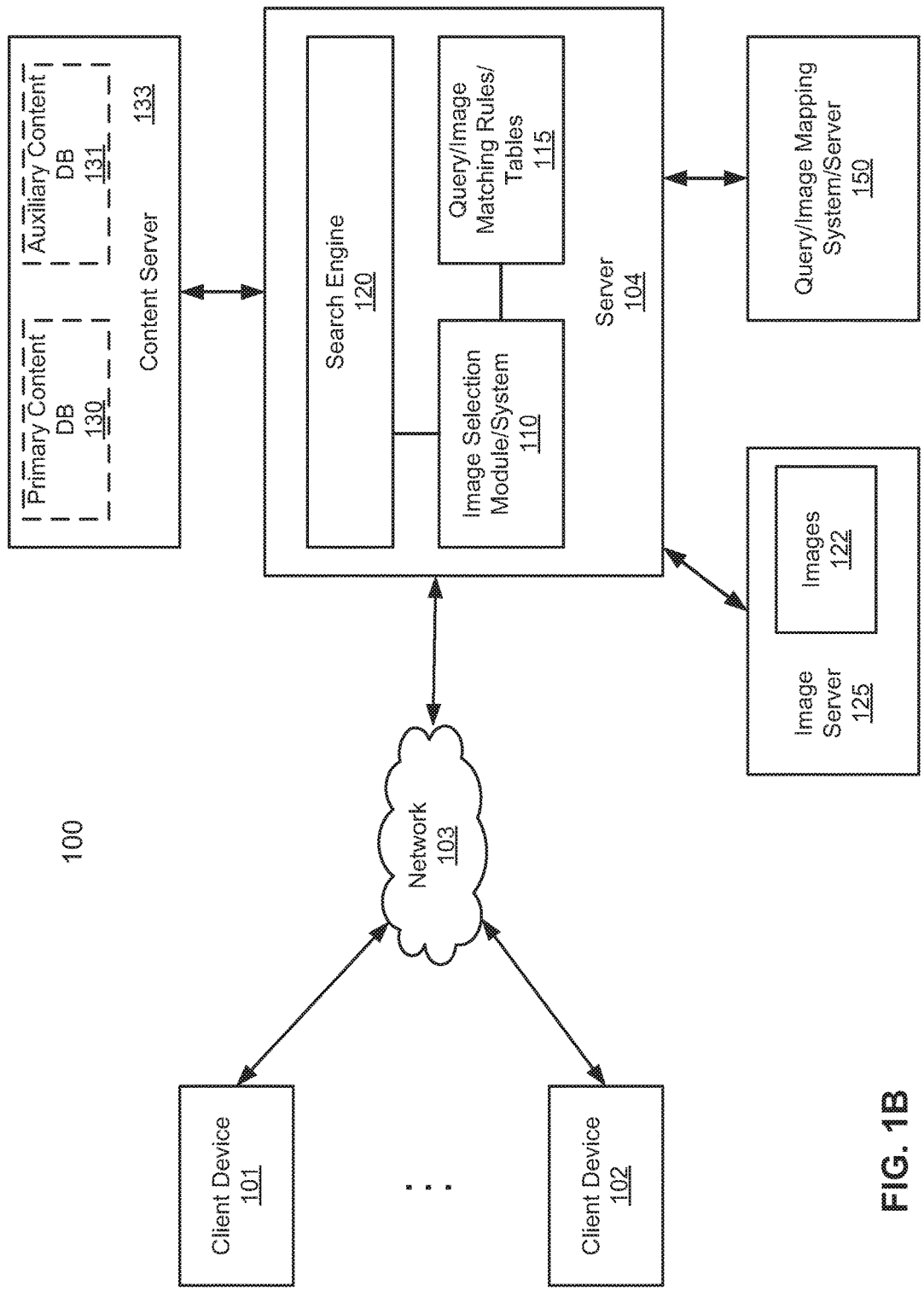

FIGS. 1A and 1B are block diagram illustrating an example of system configuration for matching images with content items according to some embodiments of the invention. Referring to FIG. 1A, system 100 includes, but is not limited to, one or more client devices 101-102 communicatively coupled to server 104 over network 103. Client devices 101-102 may be any type of client devices such as a personal computer (e.g., desktops, laptops, and tablets), a "thin" client, a personal digital assistant (PDA), a Web enabled appliance, a Smartwatch, or a mobile phone (e.g., Smartphone), etc. Network 103 may be any type of networks such as a local area network (LAN), a wide area network (WAN) such as the Internet, or a combination thereof, wired or wireless.

Server 104 may be any kind of servers or a cluster of servers, such as Web or cloud servers, application servers, backend servers, or a combination thereof. In one embodiment, server 104 includes, but is not limited to, search engine 120, image selection module 110, and query/image matching rules 115. Server 104 further includes an interface (not shown) to allow a client such as client devices 101-102 to access resources or services provided by server 104. The interface may include a Web interface, an application programming interface (API), and/or a command line interface (CLI).

For example, a client, in this example, a user application of client device 101 (e.g., Web browser, mobile application), may send a search query to server 104 and the search query is received by search engine 120 via the interface over network 103. In response to the search query, search engine 120 extracts one or more keywords (also referred to as search terms) from the search query. Search engine 120 performs a search in content database 133, which may include primary content database 130 and/or auxiliary content database 131, to identify a list of content items that are related to the keywords. Primary content database 130 (also referred to as a master content database) may be a general content database, while auxiliary content database 131 (also referred to as a secondary or accessory content database) may be a special content database. Search engine 120 returns a search result page having at least some of the content items in the list to client device 101 to be presented therein. Search engine 120 may be a Baidu® search engine available from Baidu, Inc. or alternatively, search engine 120 may represent a Google® search engine, a Microsoft Bing™ search engine, a Yahoo® search engine, or some other search engines.

A search engine, such as a Web search engine, is a software system that is designed to search for information on the World Wide Web. The search results are generally presented in a line of results often referred to as search engine results pages. The information may be a mix of Web pages, images, and other types of files. Some search engines also mine data available in databases or open directories. Unlike web directories, which are maintained only by human editors, search engines also maintain real-time information by running an algorithm on a web crawler.

Web search engines work by storing information about many web pages, which they retrieve from the hypertext markup language (HTML) markup of the pages. These pages are retrieved by a Web crawler, which is an automated Web crawler which follows every link on the site. The search engine then analyzes the contents of each page to determine how it should be indexed (for example, words can be extracted from the titles, page content, headings, or special fields called meta tags). Data about web pages are stored in an index database for use in later queries. The index helps find information relating to the query as quickly as possible.

When a user enters a query into a search engine (typically by using keywords), the engine examines its index and provides a listing of best-matching web pages according to its criteria, usually with a short summary containing the document's title and sometimes parts of the text. The index is built from the information stored with the data and the method by which the information is indexed. The search engine looks for the words or phrases exactly as entered. Some search engines provide an advanced feature called proximity search, which allows users to define the distance between keywords. There is also concept-based searching where the research involves using statistical analysis on pages containing the words or phrases you search for. As well, natural language queries allow the user to type a question in the same form one would ask it to a human.

The usefulness of a search engine depends on the relevance of the result set it gives back. While there may be millions of web pages that include a particular word or phrase, some pages may be more relevant, popular, or authoritative than others. Most search engines employ methods to rank the results to provide the "best" results first. How a search engine decides which pages are the best matches, and what order the results should be shown in, varies widely from one engine to another.

Referring back to FIG. 1A, according to one embodiment, in response to a search query received at server 104 from a client device, in this example, client device 101, search engine 120 performs a search in content database 133, such as primary content database 130 and/or auxiliary content database 131, to generate a list of content items. Each of the content items may be associated with a particular Web page of a particular Web site of a particular content provider via a uniform resource link (URL) and/or a uniform resource identifier (URI). In one embodiment, primary content database 130 stores general content items that have been collected by network crawlers (e.g., unsponsored content). Auxiliary content database 135 stores specific or special content items that are associated with specific, known, or predetermined content providers (e.g., sponsored content). Alternatively, content database 133 may be implemented as a single database without distinguishing primary content database 131 from auxiliary content database 132.

Network crawlers or Web crawlers are programs that automatically traverse the network's hypertext structure. In practice, the network crawlers may run on separate computers or servers, each of which is configured to execute one or more processes or threads that download documents from URLs. The network crawlers receive the assigned URLs and download the documents at those URLs. The network crawlers may also retrieve documents that are referenced by the retrieved documents to be processed by a content processing system (not shown) and/or search engine 120. Network crawlers can use various protocols to download pages associated with URLs, such as hypertext transport protocol (HTTP) and file transfer protocol (FTP).

In addition, according to one embodiment, image selection module or system 110 searches based on the keywords associated with the search query in query-image (query/image) mapping rules or tables 115 (also referred to as query/image matching rules or tables) to identify a list of image IDs identifying images that are related to the keywords associated with a search query. Query/image matching rules/tables 115 may be implemented in a variety of data structures such as a table or database. Based on the image IDs, a list of image candidates can be identified and retrieved from images 123 stored in image store 125, where image store 125 may also store image metadata describing images 122 (not shown). In one embodiment, images 122 and their respective metadata may be obtained by one or more image or network crawlers that are designed to craw the networks to collect images as well as their surrounding metadata. Images 122 may be non-privileged, non-copyrightable, properly licensed images, or any other authorized images. The image candidates may be ranked based on a ranking score between the keywords and the image candidates, as well as metadata of the content items. For each of the content items found in content database 133, an image is selected from the list of image candidates to be associated with the content item. The selected image may be incorporated with the content item to generate an incorporated or composite content item. For example, the selected image may serve as a background image to the content item. The list of incorporated content items and images is returned to client device 101 as part of a search result.

According to one embodiment, query/image mapping rules 115 may be previously compiled and generated prior to receiving the search query (e.g., offline). The set of query/image matching rules 115 is configured to map one or more keywords to one or more image identifiers (IDs) identifying one or more images. The keywords may be identified as the keywords that are more likely be used in search queries and/or keywords associated with certain content items. Such keywords may be identified based on an analysis or tracking of user searching activities or search history, which may be compiled for a period of time.

Subsequently when a search query is received by search engine 120 from a client device for searching content, a search is performed in content database 133 to retrieve a list of content items. In addition, an analysis is performed, for example, by image selection module 110, on the query to determine one or more keywords associated with the query. The determined keywords may be the keywords included in the search query. The determined keywords may further include certain keywords that are semantically similar or have the same meaning of the keywords originally in the search query (e.g., synonymous words or phrases). Based on the keywords, a list of one or more images are identified from image store 125 using the set of query/image matching rules 115.

According to one embodiment, the identified images may be ranked by image selection module 110, using a variety of ranking algorithms or ranking models, which have been generated and configured by query/image mapping system 150. For each of the images that are identified as image candidates to be matched with a content item, a feature score is calculated for each of the features (e.g., image attributes or properties, and/or any other metadata or circumstantial data surrounding the image) that are extracted or determined from the image. Each feature may be calculated using a specific feature score algorithm that has been trained or configured based on features of a large amount of images utilized to match content items in response to a large amount of search queries in the past. In addition, a matching type score between the image and the content item is determined based on metadata of the image, the search query, and the content item. A matching type score may be different dependent upon a matching type between a search query and an image that is identified based on the search query (e.g., matching keywords between the search query and the image). A matching type can an exact match, a partial match, or a broad match (e.g., semantic match), each being associated with a specific matching type score.

A matching quality score is then calculated based on at least some of the feature scores of the features and the matching type score is calculated. The features associated with an image may include a variety of metadata, such as, for example, image attributes or properties (e.g., resolution, brightness, contrast, orientation, size, source of the image, content represented by the image). A matching quality score may be calculated using a predetermined algorithm based on the matching type score and the feature scores. Alternatively, a matching quality score may be determined by applying the matching type score and the feature scores to a ranking model that has been trained using historic image data, query data, and user interactive data. The matching quality score is then utilized as a ranking score to rank the corresponding image in view of the matching quality scores of other images. One of the images having a ranking score higher than a predetermined threshold may be selected to be matched with the content item, for example, as a background image with respect to the content item.

Note that the configuration of server 104 has been described for the purpose of illustration only. Server 104 may be a Web server to provide a frontend search service to a variety of end user devices. Alternatively server 104 may be an application server or backend server that provides specific or special content search services to a frontend server (e.g., Web server or a general content server), and to match and/or integrate images with content items of a content database or server. Query/image mapping system 150 may also be implemented as a separate server, which is responsible for creating query/image mapping rules or tables 115 based on the content items and their respective associated keywords of content database or server 133.

Other architectures or configurations may also be applicable. For example, as shown in FIG. 1B, content database 133 may be maintained and hosted in a separate server as a content server over a network. Similarly, image store 125 may be maintained and hosted in a separate server as an image server having an image searching engine therein. Servers 133 and 125 may be Web servers, application servers, or backend servers. Content server 133 and/or image server 125 may be organized and provided by the same entity or organization as of server 104. Alternatively, content server 133 and/or image server 125 may be maintained or hosted by separate entities or organizations (e.g., third-party providers), which are responsible for collecting contents in content databases 130-131 and images 122 and their metadata.

Also note that content database/server 133 may include primary content database 130 and auxiliary content database 131. Primary content database 130 may also be implemented or maintained in a separate content server, referred to as a primary content server. Similarly, auxiliary content database 131 may be implemented or maintained in a separate content sever, referred to as an auxiliary or accessory content server. The content items obtained from both content databases 130-131 may be matched with images obtained from image store/server 125 using a variety of matching formulas. Alternatively, only content items obtained from one of primary content database 130 and auxiliary content database 131 will be matched with images obtained from image store/server 125. For example, content items obtained from auxiliary content database 131 (e.g., sponsored content) will be matched with the images obtained from image store/ server 125, while content items obtained from primary content database 130 (e.g., general content) will be returned to the client device without modification as part of the search result.

Figure 2:
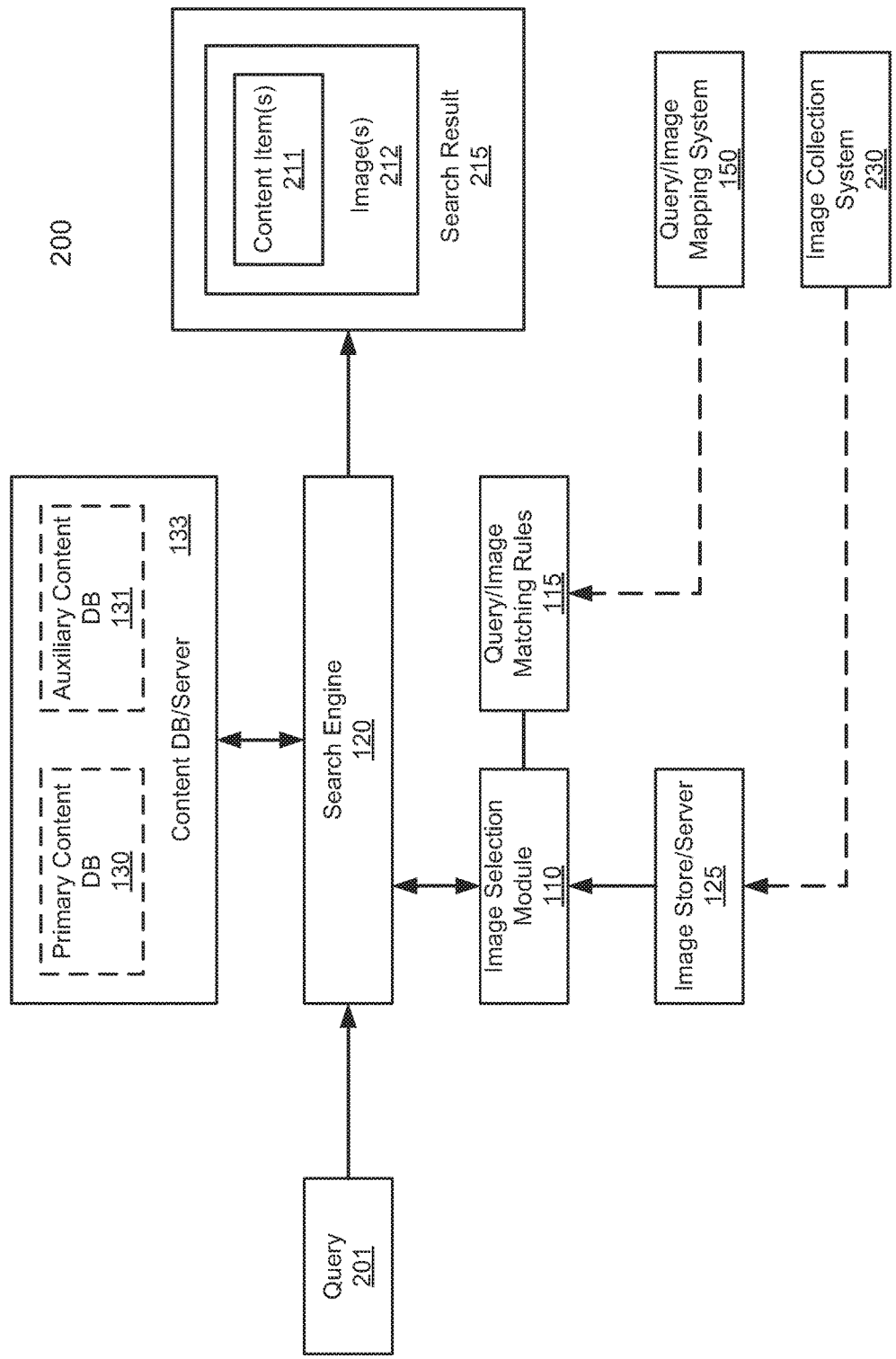
FIG. 2 is a block diagram illustrating an example of an image selection system according to one embodiment of the invention.

FIG. 2 is a block diagram illustrating a system for matching images with content items according to one embodiment of the invention. System 200 may be implemented as part of system 100 of FIGS. 1A-1B. Referring to FIG. 2, when search query 201 is received from a client device (e.g., client device 101 of FIG. 1), search engine 120 performs a first search in content database or content server 133 to identify and retrieve a first list of content items based on one or more keywords or search terms associated with search query 201. In addition, search engine 120 communicates with image selection module 110 to identify a list of images from image store or image sever 125 based on the keywords associated with search query 201 using a set of query/image matching rules 115. Search engine 120 and/or image selection module 110 may perform an analysis on the query to derive a list of keywords that are included in search query 201 and/or similar to the keywords in search query 201 (e.g., semantically similar terms, synonymous terms). The searches performed in content database/server 133 and/or image store/server 125 may be performed on the list of expanded keywords.

In one embodiment, image selection module 110 and/or query/image matching rules 115 may be integrated with search engine 120. Query/image matching rules 115 may be previously configured or compiled, for example, by query/image mapping system 150. Query/image mapping system 150 may be hosted in a separate system or server communicatively coupled to system 200 via an API or over a network. Query/image mapping system 200 may include a user interface to allow a user or an administrator to configure a set of query/image matching rules, which may then be expanded and ranked using a predetermined algorithm by processing logic. Further details of query/image mapping system 200 will be described further below.

Similarly, images stored in image store/server 125 may be collected by image collection system 230, which may be a separate system or server communicatively coupled to system 200 over a network. Query/image mapping system 150 and/or image collection system 230 may be operated by the same or different entity or organization as of system 200. In this example, images may be cached and stored in a local image store with respect to system 200 (e.g., local to server 104). Alternatively, images may be maintained by a designated server associated with image collection system 230, with which image selection module 110 communicates to identify and retrieve the list of images via API.

Based on the list of images retrieved from image store/server 125, image selection module 110 ranks the images according to a ranking algorithm. Some of the images are then matched with some of the content items identified and retrieved from content database/server 133. The matched content items and images are then integrated into integrated content items. In one embodiment, an image may be selected as a background image or a complementary image to a content item. For example, content item 211 may be a description or text and image 212 may be selected to be a background image for content item 211. Image 212 is selected based on the matching techniques described throughout this application to complement or describe content item 211, or vice versa, in an appropriate manner. For example, the content of content item 211 is related to the content as shown in image 212, or vice versa. The integrated images 212 and content items 211 may be returned to the client device as a part of search result 215.

Note that content database/server 133 may include primary content database 130 and auxiliary content database 131. Primary content database 130 may also be implemented or maintained in a separate content server, referred to as a primary content server. Similarly, auxiliary content database 131 may be implemented or maintained in a separate content sever, referred to as an auxiliary content server. The content items obtained from both content databases 130-131 may be matched with images obtained from image store/server 125 using a variety of matching formulas, which will be described details further below. Alternatively, only content items obtained from one of primary content database 130 and auxiliary content database 131 will be matched with images obtained from image store/server 125. For example, content items obtained from auxiliary content database 131 (e.g., sponsored content) will be matched with the images obtained from image store/server 125, while content items obtain from primary content database 130 (e.g., general content) will be returned to the client device without modification as part of search result 215.

According to one embodiment, in response to search query 201 received from a client device, one or more keywords are determined based on search query 201, where the keywords may include those in search query 201 or those expanded based on an analysis on search query 201. Based on the keywords, a lookup operation or search is performed in query/image matching rules 115, which may be implemented in a variety of data structures, such as, for example, a database or a table. For the purpose of illustration, query/image matching rules 115 is referred to as a query/image matching table.

Query/image matching table 115 includes a number of matching entries. Each matching entry maps one or more keywords to one or more image IDs that identify one or more images stored in image store/server 125. Based on the keywords obtained based on search query 201, a list of one or more image IDs may be obtained from query/image matching table 115. Based on the image IDs, the corresponding images are obtained from image store/server 125 as image candidates. The image candidates are then ranked and matched using one or more predetermined ranking and/or matching algorithms, which will be described in details further below. The top ranked images may then be selected to be associated with the content items for integration as part of search result 215. Note that some or all of the components or modules as shown in FIG. 2 may be implemented in software, hardware, or a combination thereof.

FIGS. 3A-3B are examples of query-image matching tables according to certain embodiments of the invention. Referring to FIG. 3A, query/image matching table 300 may represent query/image matching rules 115 of FIGS. 1A-1B and 2 as described above. In one embodiment, query/image matching table 300 includes a number of matching entries. Each of the matching entry maps one or more keywords 301 to one or more image IDs 302, where image IDs 302 identify the corresponding images in an image store or image server, such as image store/sever 125. Matching table 300 is indexed based on the keywords. In this example, a first entry maps a term "flower" to images 1-5. A second entry maps a term "Beijing flower" to image 1 only. A third entry maps a term "Shanghai flow" to image 2. A fourth entry maps a term "flower delivery" to images 1-2 and 4. Thus, if a search query contains "Beijing flower," images 1-5 may be identified. However, image 1 may have a higher ranking.

Referring now to FIG. 3B, which is an example of an alternative embodiment of a matching table, this is an image-keyword (image/keyword) matching table that may be utilized as part of query/image matching rules 115. In this example, image/keyword matching table 350 includes a number of matching entries. Each matching entry maps an image ID 351 to one or more keywords 352. Matching table 350 is indexed based on image IDs. Both tables 300 and 350 may be utilized interchangeably. For example, table 300 may be used to identify all of the images that are related to one or more keywords. For each of the images that are identified via table 300, a matching degree or matching type between keywords 352 and the keywords in the search query is determined to rank images identified by image IDs 351.

A matching degree or matching type may be an exact match, a partial match (e.g., a phrase match), or a broad match (e.g., a semantic match). For example, a matching type score may be calculated based on a number of keywords in the search query match keywords 352. If the keywords in a search query exactly match those in field 352, the corresponding image identified in field 351 would have the highest matching degree or matching type score. Fewer matched keywords between the search query and field 352 lead to lower matching degree or matching type score. Semantically matched keywords (e.g., not actually matched, but synonymous words or different words having the same or similar meanings) may have the lowest matching degree or matching type score. Each of the matching type is associated with a matching type score, which can be utilized in part to calculate a final ranking score. In one embodiment, a matching type score for the exact match is 1; a matching type score for a partial match is 0.5; and a matching type score for a broad match is 0.2.

Figure 4:
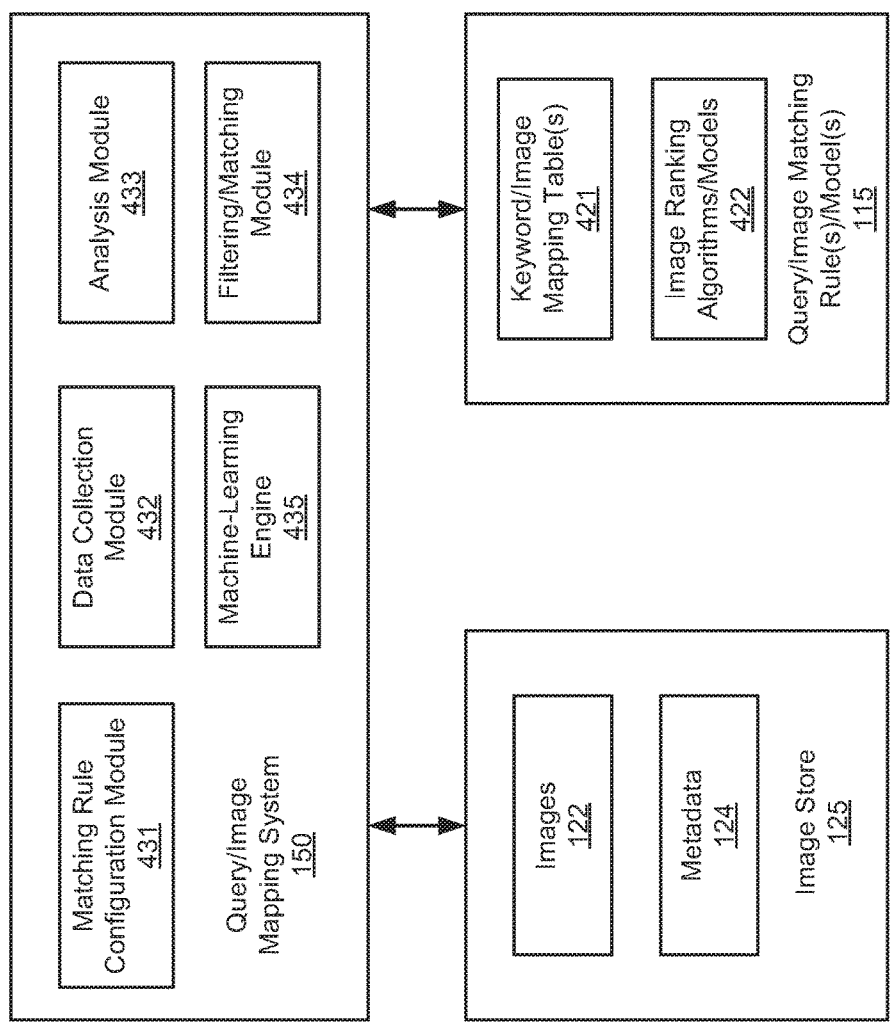
FIG. 4 is a block diagram illustrating a query-to-image mapping system according to one embodiment of the invention.

FIG. 4 is a block diagram illustrating a query-to-image mapping system according to one embodiment of the invention. System 400 may be implemented as part of system or sever 150 of FIGS. 1A-1B. Referring to FIG. 4, system 400 includes, but is not limited to, query/image mapping system 150, image store 125, and query/image matching rules 115. In one embodiment, query/image mapping system 200 is utilized to configure and generate a set of query/image matching rules 115 to map certain keywords to images stored in image store 125.

Image store 125 may be maintained locally or remotely in a designated server over a network. The keywords utilized in mapping in query/image matching rules may be the keywords that are more likely used in search queries. Image store 125 stores images 122 and their respective metadata 124. Query/image matching rules 115 include keyword/image mapping tables 421 and image ranking algorithms or models 422. Keyword/image mapping tables 421 may be implemented as any of mapping tables as shown in FIGS. 3A and 3B.

In one embodiment, query/image mapping system 150 includes matching rule configuration module 431, data collection module 432, analysis module 433, matching module 434, and machine-learning engine or training module 435. Modules 431-435 may be implemented in software, hardware, or a combination thereof. In one embodiment, configuration module 431 may be utilized to configure keyword/image mapping table 421, for example, in response to a user request via a user interface. Keyword/image mapping table 421 includes a number of mapping entries. Each mapping entry maps a keyword to one or more image IDs identifying one or more of images 122 stored in image store 125. Images 122 and metadata 124 may be periodically collected and updated by data collection module 432. Data collection module 432 may employ some Web crawlers to craw and collect the images and their surrounding information or metadata 124.

In one embodiment, metadata 124 includes a variety of information or data describing images 122, where metadata may be obtained or collected by a designated data collection module or system, such as data collection module 432. For example, image metadata may be collected at the time of a corresponding image is obtained. The image metadata may include a source from which the image is collected and a time of the collection. A source from which an image is obtained may be a Web page or a document in which the image is attached. An address such as a universal resource locator (URL) of the source page may be collected. In addition, an analysis may be performed on the content of the source page to determine the content possibly represented by the image. An image recognition may also be performed on the image to determine the content of the image (e.g., whether the image is about a person, an object, landscape, texts, or a combination thereof). In addition, attributes of the image, such as an aspect ratio, pixel counts, brightness, contrast, time of the image taken, and style (e.g., landscape vs. portrait, size of the image), may also be collected. Further, prior user interactions with the image and/or keyword in the past (e.g., a click through rate) may also be determined based on the history interactions associated with the image. These information may be compiled as part of metadata of the images 124, also referred to as features of the images for the purpose of scoring.

Based on the metadata, filtering and matching module 434 performs a filtering operation to determine whether a particular keyword sufficiently describing the image by matching the semantic meanings between the keyword and the metadata of a particular image. For example, if a keyword appears in a source page from which the image was collected, the keyword is related to the image. Similarly, if a keyword describes at least a portion of content of the image in response to an image recognition, the keyword may be related. If it is determined that a keyword does not sufficiently describes a particular image or vice versa based on the analysis on the metadata, that particular image may be removed. If it is determined that the prior user interactions with a particular image is below a predetermined threshold (e.g., fewer user interactions, less user interest or unpopular), that particular image may be removed from keyword/image mapping table 421. Note that throughout this application, the terms of "matching rule," "mapping rule," "matching table," and "mapping table" are interchangeable terms for the purposes of illustration. However, they can be implemented in a variety of data structures or formats.

In one embodiment, analysis module 433 perform an analysis on at least metadata 124 of images 122 to extract or obtain various image features associated with images 122 and their metadata 124. Based on the analysis, a set of feature scoring formulas or algorithms are determined based on the features of the images such as those listed above. For each of the features, a scoring formula or algorithm may be generated. In addition, a matching quality scoring formula or algorithm is also determined. Alternatively, the features and/or features scores may be trained or learned by machine learning engine 435 to create a ranking model to determine a ranking score for a particular image. These algorithms and/or models can then be stored as part of image ranking algorithms/models 422, which can be utilized online to rank the image candidates to be matched with a content item in response to a search query. The image candidates may be identified using keyword/image mapping table 421 in response to a search query.

Figure 5:
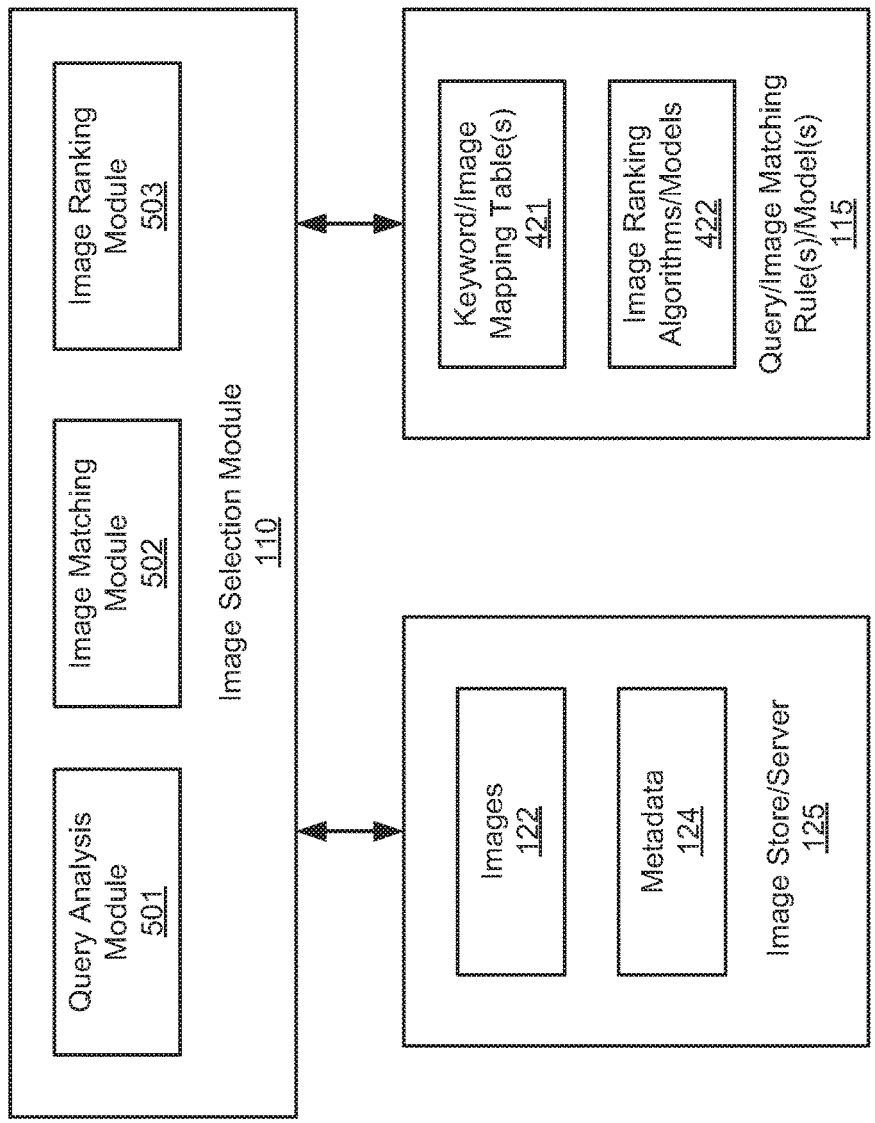
FIG. 5 is a block diagram illustrating an example of a query-image matching system according to another embodiment of the invention.

FIG. 5 is a block diagram illustrating an example of a query-image matching system according to another embodiment of the invention. System 500 may be implemented as part of system 200 of FIG. 2. Referring to FIG. 5, system 500 may be incorporated with system 200 of FIG. 2. Alternatively, system 500 may be implemented as a standalone system or a server communicatively coupled to system 200 of FIG. 2, for example, via an API or a communication protocol over a network or a connection. In one embodiment, system 500 is responsible for identifying, ranking, and selecting images to be matched with content items found in response to a search query at runtime, in response to a search query for searching content.

In one embodiment, image selection module 110 includes query analysis module 501, image matching module 502, and image ranking module 503, where some or all of these modules may be implemented in software, hardware, or a combination thereof. In one embodiment, in response to a search query received from a client device for searching content, the search query is analyzed by query analysis module 501 to determine one or more keywords. A search or lookup operation is performed by image matching module 502 in keyword/image mapping table 421 based on the keywords. The keyword/image mapping table 421 includes multiple entries and each entry maps an image ID identifying an image to one or more keywords, or vice versa (e.g., matching tables as shown in FIGS. 3A-3B). For each of the images identified as image candidates, a ranking process is performed by image ranking module 503 to determine a ranking score for the image. The images may be ranked or sorted based on image ranking algorithms or models 422, which may be configured by system 400 of FIG. 4 as described above.

Figure 6:
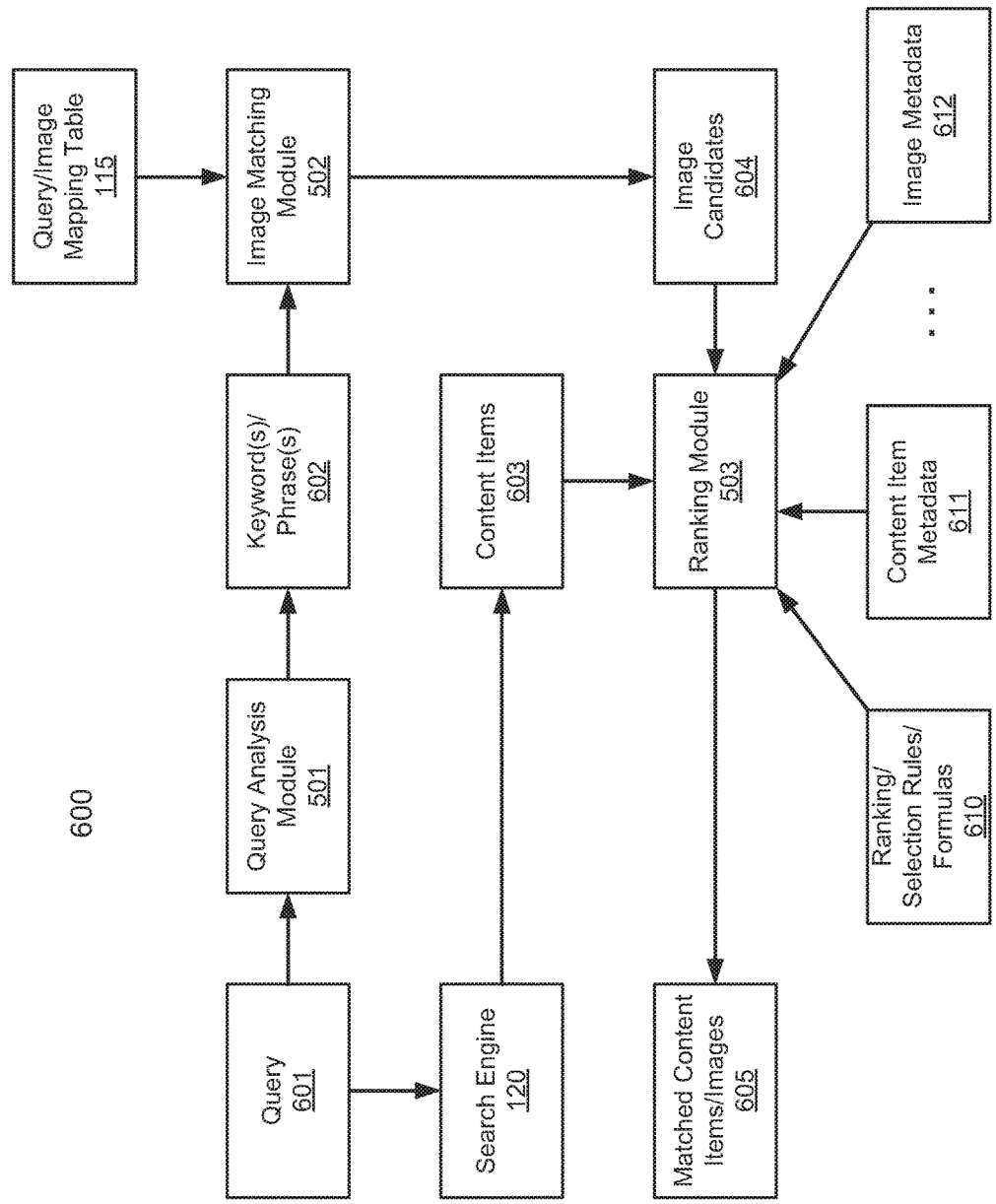
FIG. 6 is a block diagram illustrating an example of a query-image matching system according to another embodiment of the invention.

FIG. 6 is a block diagram illustrating an example of a query-image matching system according to another embodiment of the invention. System 600 may be implemented as part of matching systems described above. Certain components having the same or similar functionalities as of those described above will be referenced using the same reference numbers. The description set forth above with respect to the components with the same reference numbers will be equally applied herein.

Referring to FIG. 6, according to one embodiment, when search query 601 is received, search engine 120 performs a search in a content database or via a content server to identify and retrieve a list of content items 603, which may be incorporated into a search result. Content items 603 may be retrieved from a general content database/server, an auxiliary content database/server (e.g., sponsored content, special content), or both. Meanwhile, query analysis module 501 performs an analysis on the keywords or search term of search query 601 to derive a list of keywords 602. Based on keywords 602, image matching module 502 searches or looks up in query/image mapping table or rules 115 to identify a list of image candidates 604, as described above.

Based on image candidates 604 and content items 603, ranking module 503 is to perform a ranking process based on content items 603, metadata 611 associated with content items 603, image candidates 604, and metadata 612 associated with image candidates 604. The ranking process may be performed using a predetermined ranking formula 610 based on the relationships amongst content items 603, metadata 611 associated with content items 603, image candidates 604, and metadata 612 associated with image candidates 604. As a result of the ranking process, matched pairs 605 of a content item and an image are generated. The matched content item and image may be integrated into integrated content items. For example, a content item (e.g., a text) may be superimposed onto a matched image, where the matched image serves as a background image. Alternatively, the matched image is placed next to the content item to complement the content item. A search result having the integrated content items therein is transmitted to a client device that initiated the search query 601.

In one embodiment, in ranking the image candidates 604 in view of content items 603, all information or data surrounding image candidates 604 and content items 603 are considered by ranking module 503, collectively referred to as content item metadata 611 and image metadata 612. A score matrix is computed based on a matching score between each of content items 603 and each of image candidates 604. In calculating a matching score (also referred to as a ranking score) for each pair of one of the content items and one of the image candidates, an individual matching score is calculated for each of predetermined attributes or parameters associated with the content item and the image candidate of the pair. The individual matching scores may be determined based on corresponding data obtained from content item metadata 611 and/or image metadata 612, using an individual scoring formula associated with the corresponding attribute or parameter. An overall matching or final ranking score is then determined based on the individual matching scores using an overall scoring or ranking formula. If more than one match have an identical matching score, a tie-breaking formula may be applied to assign different images to different content items. Alternatively, an image may be assigned to multiple content items, dependent upon the specific situation.

The attributes or parameters obtained from metadata 611-612 used in scoring the content items and image candidates can be a variety of data, which may be collected using a data collection module (not shown) over a period of time. In one embodiment, a matching score between a content item and an image candidate can be determined in part based on a matching quality between the content item and the image candidate. The term of "matching quality" may refer to whether a content item describes the content recognized from an image being matched. For example, the matching quality may be determined based on whether the title and/or description match the content presented by the image. The content represented by an image may be determined via an image recognition process performed by an image recognition module or system (not shown). The matching quality may be determined further based on whether the content item and the image were obtained from the same or similar sources (e.g., same address such as URL, same domain, or provided by the same or similar providers).

In one embodiment, a matching score between a content item and an image candidate can be determined in part based on prior user interactions between the content item and the image (e.g., prior user access patterns or behaviors), which is referred to as a click-through rate. The prior user interactions may be obtained from a history log of user interactions collected over a period of time by a data collection module or data collection system (not shown). A history log records user interactions with contents and/or images accessed or browsed by users, including information identifying the users (e.g., IP addresses, domain, usernames), how many users have accessed the content items and/or images, the time of the accesses, how long the users stayed at content pages representing the content items and/or images, how frequent the users visited the content pages. The click-through rate may further record the clicks on a content item, an image, or both the content item and the image represented together by users.

In one embodiment, a matching score between a content item and an image candidate can be determined in part based on image quality of an image. The image quality may include, but is not limited to, the size of the image (e.g., height and width), resolution (e.g., pixel counts), aspect ratio, layout (e.g., landscape, portrait), the time when the image was taken (e.g., whether the image is up-to-day). The matching score may further be based on an innovation or style of the image, such as, for example, brightness, contrast, camera settings, or any other metadata associated with the image. These attributes or properties may be referred to as features of the image. Each feature may be associated with a feature score.

In one embodiment, a ranking score for an image is determined based on a matching type score and a matching quality score. A matching type score is calculated based on a matching type between keywords associated with the search query and keywords associated with the image. The keywords associated with the images may be obtained from keyword/image mapping table 421 as shown in FIGS. 3A-3B. A matching type can be an exact match, a partial match, and a broad match. According to one embodiment, a matching score for the exact match may be 1, while matching scores for the partial match and broad match are 0.5 and 0.2, respectively. An exact match refers to the situation in which the keywords of the search query and the keywords of the image are exactly matched. A partial match refers to the situation in which only a portion of the keywords of the search query match the keywords of the image. A broad match refers to the situation in which there is no keyword matched between the search query and the image. However, at least some of the keywords between the search query and the image are semantically related or similar (e.g., semantically matched).

Figure 7:
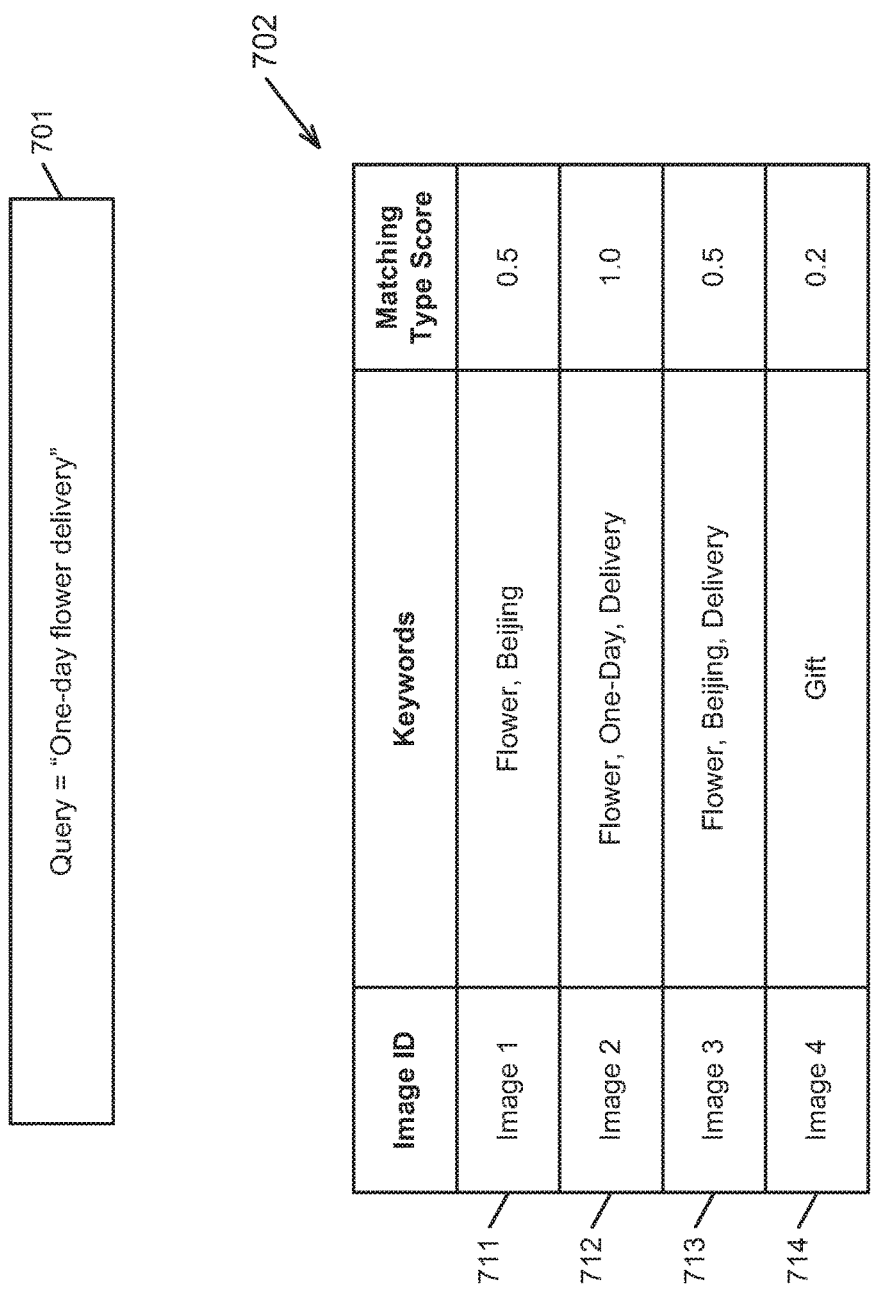
FIG. 7 is a block diagram illustrating an example of matching types according to one embodiment of the invention.

FIG. 7 is a block diagram illustrating an example of matching types according to one embodiment of the invention. Referring to FIG. 7, given search query 701 and keyword/image mapping table 702, the matching type for image 712 is an exact match, which would have a matching type score of 1. Images 711 and 713 would have a matching type score of 0.5 since their keywords are only partially matched. The matching type score for image 714 will be 0.2 since the corresponding matching type is a broad match, because the keywords are only semantically matched.

According to one embodiment, a matching quality score between a content item and an image may be determined based on a number of keywords that are matched between a corresponding search query that yields the content item and the keywords of a particular entry corresponding to the image, a number of keywords included in the search query, and/or a number of keywords included in that particular entry, as well as a matching type score between the searching query and the image. In one embodiment, the matching quality score is determined based on a first ratio between a number of matched keywords and a number of keywords in the search query and a second ratio between a number of matched keywords and a number of keywords associated with the image. The matching quality score may be determined based on a product of the first and second ratios. In one particular embodiment, a matching quality score of a particular image can be calculated as follows:

Matching quality score=Matching type score*(a number of matched keywords/a number of key-words in a search query)$^\alpha$*(a number of matched keywords/a number of keywords in a match entry corresponding to the image)$^\beta$ where coefficients $\alpha$ and $\beta$ can be adjustable or trained as weight factors.

FIG. 8 is a block diagram illustrating an example of a scoring matrix for determining matching scores according to one embodiment of the invention. Scoring matrix 800 may be compiled or generated by a ranking module, such as image ranking module 503 of FIG. 5. Referring to FIG. 8, it is assumed content items 801 have been identified and retrieved by a search engine based on one or more keywords associated with a search query from a content database or content server (e.g., sponsored content). In addition, a list of image candidates 821-823 have been identified that are related to certain keywords associated with the search query, as described above.

In one embodiment, for each of the content items 801, individual matching scores for a set of predetermined attributes or parameters 802-807 are calculated. The individual matching scores 802-807 may be calculated using a specific or corresponding individual matching score formula by an individual matching score calculator. As described above, each of the attributes, features, or parameters 802-807 may be associated with a specific weight factor or coefficient in calculating the individual matching score. Although not shown, the individual matching scores may also be calculated for each of images 822-823. An overall or final score 810 is calculated for each of the content items 801 for each of the images 821-823. The overall or final ranking scores of images 821-823 calculated for a particular content item are then used to select one of images 821-823 to be associated with that particular content item.

In one embodiment, an image having the highest overall ranking score for a particular content item is selected to be associated with that content item. For example, it is assumed image 821 has the highest overall ranking score amongst images 821-823. Image 821 may be selected to be associated with content item 1. If the same image has the same highest ranking score for more than one content item, in this example, content items 1 and 2, a tie-breaking formula may be applied to resolving the contention. In one embodiment, a sum of all overall ranking scores of all images 821-823 is calculated for each of the content items 801. The content item having the highest sum has a higher priority to select the image. Other configurations may exist.

According to another embodiment, some of the individual matching scores may be determined using a matching scoring or ranking model that is created via machine-learning based on the historical data. For example, click-through rate 803 can be determined using a model based on the historic user interactions with the images and/or content items. Alternatively, some of all of the individual matching scores can be provided to a ranking model, which will generate a final ranking score for ranking the corresponding image. The ranking model may be trained using the known historic data and/or metadata associated with the search queries, images, and content items.

Figure 9:
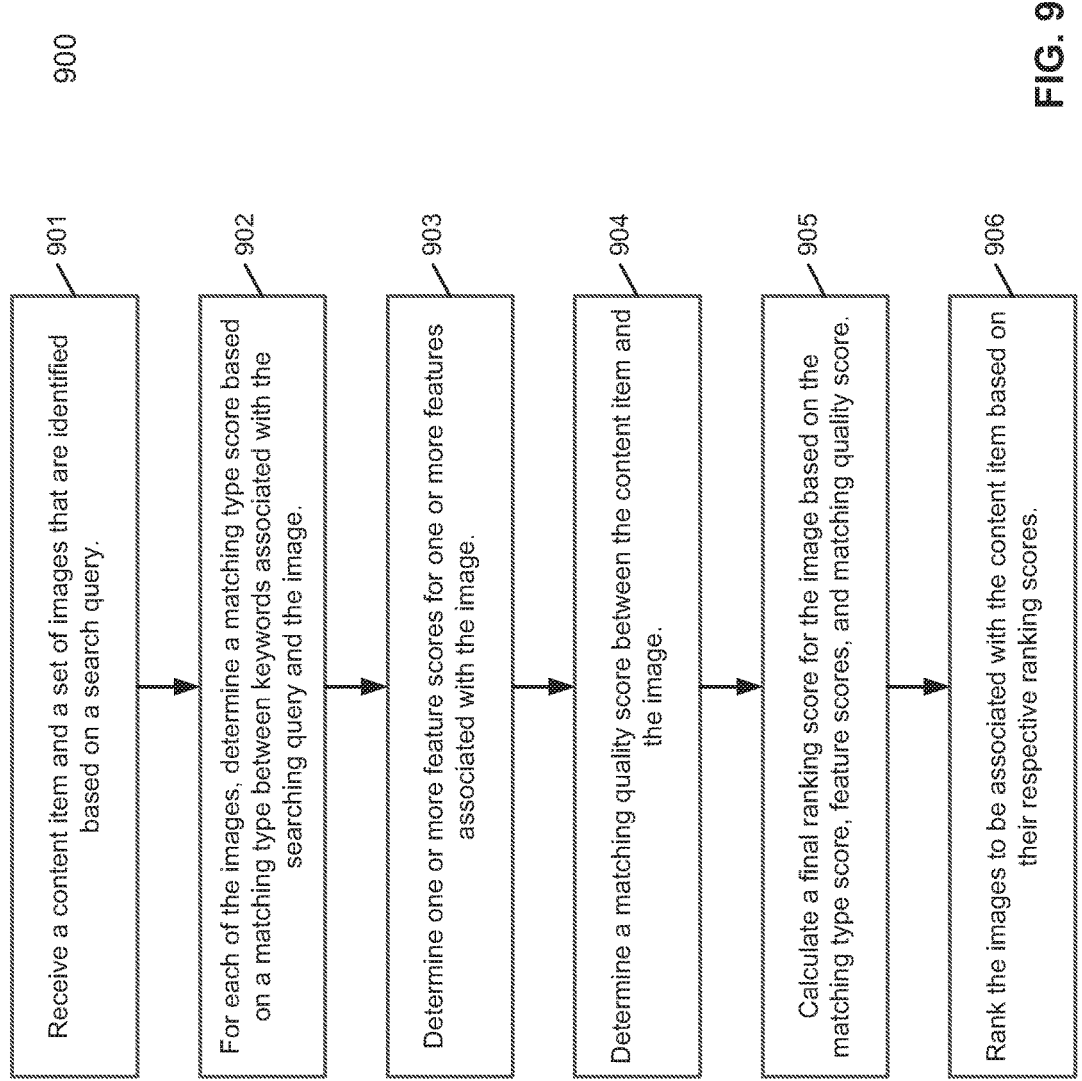
FIG. 9 is a flow diagram illustrating a process for matching images with content items based on keywords according to one embodiment of the invention.

FIG. 9 is a flow diagram illustrating a process for matching images with content items based on keywords according to one embodiment of the invention. Process 900 may be performed by processing logic which may include software, hardware, or a combination thereof. For example, process 900 may be performed by system 500 of FIG. 5. Referring to FIG. 9, at block 901, processing logic receives a content item (e.g., sponsored content item such as Ads) and a set of images that are identified based on a search query. For each of the images, at block 902, processing logic determines a matching type between the search query and the image and calculates a matching type score for the matching type. The matching type may be determined based on the keywords associated with the search query and the keywords associated with the image. The matching type can be an exact match, partial match, or a broad match as described above. At block 903, processing logic determines one or more features of the images based on metadata of the image, content represented by the image, and any other information surrounding the image. For each of the features, processing logic calculates a feature score to represent the feature using a corresponding feature scoring formula. At block 904, processing logic determines a matching quality score based on matched keywords between the search query and the image, using a matching quality scoring algorithm as described above. The matching quality score may be determined further based on the matching type score. At block 905, a final ranking score is calculated for paring the content item and the image based on the matching quality score, the matching type score, and one or more feature scores. In one embodiment, a ranking formula or ranking model is utilized to determine the ranking score by applying these scores to a predetermined ranking model. The ranking model may be trained and configured based on historic data associated with known search queries, known content items, known images, as well as known user interactions. At block 906, all the images are ranked based on their respective ranking scores and one of the images is selected to be paired with the content item.

The techniques described above can be applied to matching images with sponsored content. One type of the sponsored content is advertisement (Ads). For example, referring back to FIGS. 1A-1B, content database (DB) or server 133 may be an Ads database or Ads server. Each of the content items, e.g., Ads, is associated with a list of predefined keywords, terms, phrases, or sentences. These predefined keywords, terms, phrases, or sentences may be bidwords purchased, defined or specified by an Ads provider. In another embodiment, primary content DB 130 may store the general content generally available in a public network. Auxiliary content DB 131 may be an Ads DB. Some of the Ads may be just plain texts. By matching and integrating an image with the Ads, for example, as a background image, the Ads may be more appealing or attractive to users. Server 104 may be a Web server for searching content or alternatively, server 104 may be an Ads server.

Figure 10:
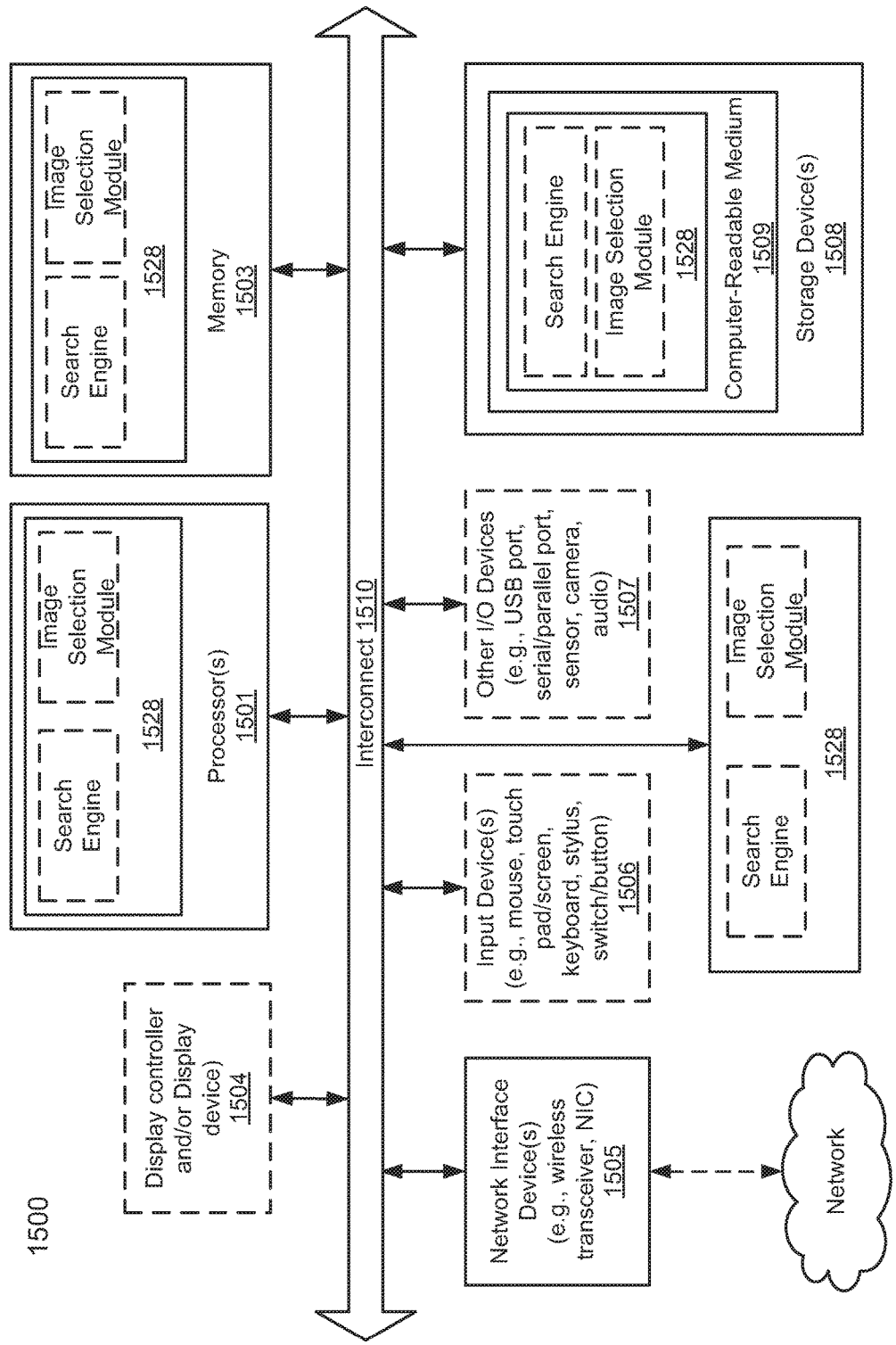
FIG. 10 is a block diagram illustrating a data processing system according to one embodiment.

FIG. 10 is a block diagram illustrating an example of a data processing system which may be used with one embodiment of the invention. For example, system 1500 may represents any of data processing systems described above performing any of the processes or methods described above, such as, for example, a client device or a server described above, such as, for example, clients 101-102, server 104, content server 133, content/image mapping system/server 150, as described above.

System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC).

The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may represent any of the components described above, such as, for example, a search engine, an encoder, an interaction logging module as described above. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for ranking images to be matched with content items, the method comprising:
    configuring a server with a search engine running thereon, the server including a query-image mapping table with mappings between keywords and image identifiers;
    collecting metadata of images associated with the image identifiers, the metadata including sources of the images, contents of the images, attributes of the images, and prior user interactions with the images;
    executing an image ranking model on the server, the image ranking model is created based on the metadata of the images and is configured to calculate ranking scores for the images based on a plurality of matching parameters obtaining from the metadata, each matching parameter includes a respective weight;
    in response to a search query received at the search engine running on the server, identifying a plurality of image identifiers in the query-image mapping tables based on one or more keywords extracted from the search query;
    identifying a plurality of images from an image server using the plurality of image identifiers to be matched with a content item that represents a text description, the content item identified by the search engine performing a search in a content database using the search query;
    for each of the identified images, calculating a final matching score using the plurality of matching parameters, including
        calculating a matching type score of a matching type parameter among the plurality of matching parameters based on a first set of one or more keywords associated with the search query, a second set of one or more keywords mapped with the image in the image-query mapping table, and the weight of the matching type parameter,
        calculating a matching quality score of a matching quality parameter among the plurality of matching parameters based on the matching type score, a first ratio, a second ratio, and the weight of the matching quality parameter,
            wherein the first ratio represents a ratio between a number of matched keywords between the first set of one or more keywords and the second set of one or more keywords and a number of keywords in the first set of one or more keywords, and wherein the second ratio represents a ratio between the number of matched keywords and a number of keywords in the second set of one or more keywords,
        calculating a click-through score of a click-through parameter among the plurality of matching parameters based on prior user actions with the identified image and prior user interactions with the content item, and the weight of click-through parameter,
        calculating an image quality score of an image quality parameter among the plurality of matching parameters based on one or more of a plurality of attributes of the identified image, and the weight of image quality parameter,
            wherein the one or more of the plurality of attributes including a size of the identified image, a resolution of the identified image, an aspect ratio of the identified image, and a time when the identified image was last updated,
        calculating an image style score of an image style parameter among the plurality of matching parameters based on whether the identified image is in a landscape format or in a portrait format and the weight of image style parameter, and
        calculating a final ranking score by summing a dot product of each of the calculated scores;
    ranking the plurality of images based on their final matching scores the image ranking model;
    selecting one of the images with a final matching score higher than a predetermined threshold, wherein the selected image is incorporated with the content item to generate an incorporated content item; and
    returning the incorporated content item and the selected image from the search engine to a client device.

2. The method of claim 1, wherein calculating a matching type score based on the first set and the second set of keywords comprises:
    assigning a first score as the matching type score in response to determining that the keywords in the first set exactly match the keywords of the second set;
    assigning a second score as the matching type score in response to determining that the keywords in the first set partially match the keywords of the second set; and
    assigning a third score as the matching type score in response to determining that the keywords in the first set semantically match the keywords in the second set.

3. The method of claim 2, wherein the first score, the second score, and the third score are different.

4. The method of claim 1, wherein the image ranking model was trained and generated based on a set of features of known images that are associated with a set of known search queries using a predetermined machine-learning mechanism.

5. The method of claim 1, wherein the server is a web server that provide a frontend search service to a plurality of end user devices, or an application server that provides content search services to a web server.

6. The method of claim 1, wherein the selected image is returned to the client device as a background image of the content item.

7. The method of claim 1, wherein the client device is one of a personal computer, a personal digital assistant, a web enable appliance, or a mobile device.

8. A non-transitory machine-readable medium having instructions stored therein, which when executed by a processor, cause the processor to perform operations of ranking images to be matched with content items, the operations comprising:
- configuring a server with a search engine running thereon, the server including a query-image mapping table with mappings between keywords and image identifiers;
- collecting metadata of images associated with the image identifier the metadata including sources of the images, contents of the images, attributes of the images, and prior user interactions with the images;
- executing an image ranking model on the server, the image ranking model is created based on the metadata of the images and is configured to calculate ranking scores for the images based on a plurality of matching parameters obtaining from the metadata, each matching parameter includes a respective weight;
- in response to a search query received at the search engine running on the server, identifying a plurality of image identifiers in the query-image mapping tables based on one or more keywords extracted from the search query;
- identifying a plurality of images from an image server using the plurality of image identifiers to be matched with a content item that represents a text description, the content item identified by the search engine performing a search in a content database using the search query;
- for each of the identified images, calculating a final matching score using the plurality of matching parameters, including
  - calculating a matching type score of a matching type parameter among the plurality of matching parameters based on a first set of one or more keywords associated with the search query, a second set of one or more keywords mapped with the image in the image-query mapping table, and the weight of the matching type parameter,
  - calculating a matching quality score of a matching quality parameter among the plurality of matching parameters based on the matching type score, a first ratio, a second ratio, and the weight of the matching quality parameter,
    - wherein the first ratio represents a ratio between a number of matched keywords between the first set of one or more keywords and the second set of one or more keywords and a number of keywords in the first set of one or more keywords, and wherein the second ratio represents a ratio between the number of matched keywords and a number of keywords in the second set of one or more keywords,
  - calculating a click-through score of a click-through parameter among the plurality of matching parameters based on prior user actions with the identified image and prior user interactions with the content item, and the weight of click-through parameter,
  - calculating an image quality score of an image quality parameter among the plurality of matching parameters based on one or more of a plurality of attributes of the identified image, and the weight of image quality parameter,
    - wherein the one or more of the plurality of attributes including a size of the identified image, a resolution of the identified image, an aspect ratio of the identified image, and a time when the identified image was last updated,
  - calculating an image style score of an image style parameter among the plurality of matching parameters based on whether the identified image is in a landscape format or in a portrait format and the weight of image style parameter, and
  - calculating a final ranking score by summing a dot product of each of the calculated scores;
- ranking the plurality of images based on their final matching scores the image ranking model;
- selecting one of the images with a final matching score higher than a predetermined threshold, wherein the selected image is incorporated with the content item to generate an incorporated content item; and
- returning the incorporated content item and the selected image from the search engine to a client device.

9. The machine-readable medium of claim 8, wherein calculating a matching type score based on the first set and the second set of keywords comprises:
- assigning a first score as the matching type score in response to determining that the keywords in the first set exactly match the keywords of the second set;
- assigning a second score as the matching type score in response to determining that the keywords in the first set partially match the keywords of the second set; and
- assigning a third score as the matching type score in response to determining that the keywords in the first set semantically match the keywords in the second set.

10. The machine-readable medium of claim 9, wherein the first score, the second score, and the third score are different.

11. The machine-readable medium of claim 8, wherein the server is a web server that provide a frontend search service to a plurality of end user devices, or an application server that provides content search services to a web server.

12. The machine-readable medium of claim 8, wherein the selected image is returned to the client device as a background image of the content item.

13. The machine-readable medium of claim 8, wherein the client device is one of a personal computer, a personal digital assistant, a web enable appliance, or a mobile device.

14. A data processing system, comprising:
- a processor; and
- a memory coupled to the processor to store instructions, which when executed by the processor, cause the processor to perform operations of ranking images to be matched with content items, the operations including
  - configuring a server with a search engine running thereon, the server including a query-image mapping table with mappings between keywords and image identifiers;
  - collecting metadata of images associated with the image identifiers, the metadata including sources of the images, contents of the images, attributes of the images, and prior user interactions with the images;
  - executing an image ranking model on the server, the image ranking model is created based on the metadata of the images and is configured to calculate ranking scores for the images based on a plurality of matching parameters obtaining from the metadata, each matching parameter includes a respective weight;

in response to a search query received at the search engine running on the server, identifying a plurality of image identifiers in the query-image mapping tables based on one or more keywords extracted from the search query;

identifying a plurality of images from an image server using the plurality of image identifiers to be matched with a content item that represents a text description, the content item identified by the search engine performing a search in a content database using the search query;

for each of the identified images, calculating a final matching score using the plurality of matching parameters, including calculating a matching type score of a matching type parameter among the plurality of matching parameters based on a first set of one or more keywords associated with the search query, a second set of one or more keywords mapped with the image in the image-query mapping table, and the weight of the matching type parameter, calculating a matching quality score of a matching quality parameter among the plurality of matching parameters based on the matching type score, a first ratio, a second ratio, and the weight of the matching quality parameter, wherein the first ratio represents a ratio between a number of matched keywords between the first set of one or more keywords and the second set of one or more keywords and a number of keywords in the first set of one or more keywords, and wherein the second ratio represents a ratio between the number of matched keywords and a number of keywords in the second set of one or more keywords, calculating a click-through score of a click-through parameter among the plurality of matching parameters based on prior user actions with the identified image and prior user interactions with the content item, and the weight of click-through parameter, calculating an image quality score of an image quality parameter among the plurality of matching parameters based on one or more of a plurality of attributes of the identified image, and the weight of image quality parameter, wherein the one or more of the plurality of attributes including a size of the identified image, a resolution of the identified image, an aspect ratio of the identified image, and a time when the identified image was last updated, calculating an image style score of an image style parameter among the plurality of matching parameters based on whether the identified image is in a landscape format or in a portrait format and the weight of image style parameter, and calculating a final ranking score by summing a dot product of each of the calculated scores;

ranking the plurality of images based on their final matching scores the image ranking model;

selecting one of the images with a final matching score higher than a predetermined threshold, wherein the selected image is incorporated with the content item to generate an incorporated content item; and returning the incorporated content item and the selected image from the search engine to a client device.

15. The system of claim 14, wherein calculating a matching type score based on the first set and the second set of keywords comprises:

assigning a first score as the matching type score in response to determining that the keywords in the first set exactly match the keywords of the second set;

assigning a second score as the matching type score in response to determining that the keywords in the first set partially match the keywords of the second set; and assigning a third score as the matching type score in response to determining that the keywords in the first set semantically match the keywords in the second set.

16. The system of claim 15, wherein the first score, the second score, and the third score are different.

17. The system of claim 14, wherein the server is a web server that provide a frontend search service to a plurality of end user devices, or an application server that provides content search services to a web server.

18. The system of claim 14, wherein the selected image is returned to the client device as a background image of the content item.

19. The system of claim 14, wherein the client device is one of a personal computer, a personal digital assistant, a web enable appliance, or a mobile device.

* * * * *